United States Patent
Enarson et al.

(10) Patent No.: US 8,327,193 B2
(45) Date of Patent: Dec. 4, 2012

(54) DATA STORAGE DEVICE INCLUDING A FAILURE DIAGNOSTIC LOG

(75) Inventors: Karl Louis Enarson, Longmont, CO (US); John Edward Moon, Superior, CO (US)

(73) Assignee: Seagate Technology LLC, Cupertino, CA (US)

( * ) Notice: Subject to any disclaimer, the term of this patent is extended or adjusted under 35 U.S.C. 154(b) by 139 days.

(21) Appl. No.: 12/422,607

(22) Filed: Apr. 13, 2009

(65) Prior Publication Data
US 2010/0262857 A1   Oct. 14, 2010

(51) Int. Cl.
G06F 11/00  (2006.01)
(52) U.S. Cl. ................. 714/42; 714/45; 714/46
(58) Field of Classification Search .................. None
See application file for complete search history.

(56) References Cited

U.S. PATENT DOCUMENTS

| | | | |
|---|---|---|---|
| 6,922,801 B2 | 7/2005 | Archibald, Jr. et al. | |
| 7,293,203 B1 | 11/2007 | Coatney et al. | |
| 7,451,355 B1 | 11/2008 | Coatney et al. | |
| 7,694,188 B2 * | 4/2010 | Raghuraman et al. | 714/47 |
| 2002/0036850 A1 * | 3/2002 | Lenny et al. | 360/31 |
| 2003/0191782 A1 | 10/2003 | Buxton et al. | |
| 2004/0103123 A1 | 5/2004 | Bradshaw | |
| 2005/0125651 A1 * | 6/2005 | Ehrlich | 713/2 |
| 2005/0192991 A1 | 9/2005 | Nomoto et al. | |
| 2006/0100805 A1 * | 5/2006 | Zayas et al. | 702/85 |
| 2006/0164902 A1 * | 7/2006 | Fung | 365/221 |
| 2006/0253724 A1 * | 11/2006 | Zhang | 714/2 |
| 2008/0189578 A1 * | 8/2008 | Raghuraman et al. | 714/47 |
| 2009/0006896 A1 | 1/2009 | Nakagawa | |
| 2009/0031083 A1 | 1/2009 | Willis et al. | |
| 2010/0067343 A1 * | 3/2010 | Kaneko | 369/53.44 |

OTHER PUBLICATIONS

"SanDisk uSSD 5000 Solid State Drive Product Manual," revision 0.3, SanDisk Corporation, Apr. 2007 (18 pages).
"IBM Solid State Storage," IBM Corporation, 2007 (4 pages).

* cited by examiner

Primary Examiner — Christopher McCarthy
(74) Attorney, Agent, or Firm — Cesari & Reed, LLP; Kirk A. Cesari

(57) ABSTRACT

In a particular embodiment, a data storage device is disclosed that can include a data storage medium having a device failure partition including a device failure log to store operational state information. The operational state information can include commands, data, performance data, and environmental data associated with the data storage device. The data storage device can further include a controller adapted to selectively store the operational state information to the device failure log in a first-in first-out (FIFO) order representing recent states of the data storage device.

14 Claims, 4 Drawing Sheets

DATA STORAGE DEVICE INCLUDING A FAILURE DIAGNOSTIC LOG

FIELD

The present disclosure relates generally to a data storage device including a failure diagnostic log, and more particularly, but not by limitation, to a data storage device including monitoring logic to capture data related to error recovery operations.

DETAILED DESCRIPTION

In the following description of the embodiments, reference is made to accompanying drawings, which are shown by way of illustration of particular embodiments. It should be understood that other embodiments may be utilized and structural changes may be made without departing from the scope of the disclosure.

When communication fails between a data storage device and a host device, such as a personal computer (such as a portable computer, a desktop computer, a server computer, and the like), a music player, a personal digital assistant (PDA), a mobile telephone, another electronic device, or any combination thereof, it can be difficult to determine the cause of the communication failure. When the data storage device fails, the data storage device manufacturer may struggle to diagnose the source of the failure, particularly when the failure cannot be duplicated in a testing environment.

In a particular embodiment, a data storage device is disclosed that can include a failure log partition within a solid-state data storage medium of the data storage device. The data storage device can further include circuitry adapted to record storage device state information, environmental parameters, received data storage commands, and/or actions taken by the controller (including failure recovery actions) to the failure log partition, which recorded data can be analyzed later to diagnose a source of a data storage device failure. In a particular example, the received commands can be stored in order to capture instances where a particular ordering of the commands caused the device failure. To recreate and/or recover from device failure, it may be helpful to analyze the state of the data storage device within the time period that immediately preceded the failure event.

In a particular embodiment, a data storage device is disclosed that can include a data storage medium having a device failure partition including a device failure log to store operational state information. The operational state information may include interface commands, data, performance data, and/or environmental data associated with the data storage device. The data storage device can further include a controller to selectively store the operational state information to the device failure log in a first in first out (FIFO) order representing recent states of the data storage device. Thus, after a storage device failure event, the device failure log can include information about the storage device during a time period immediately preceding the failure, which information can be used to diagnose a source of the failure.

Figure 1:
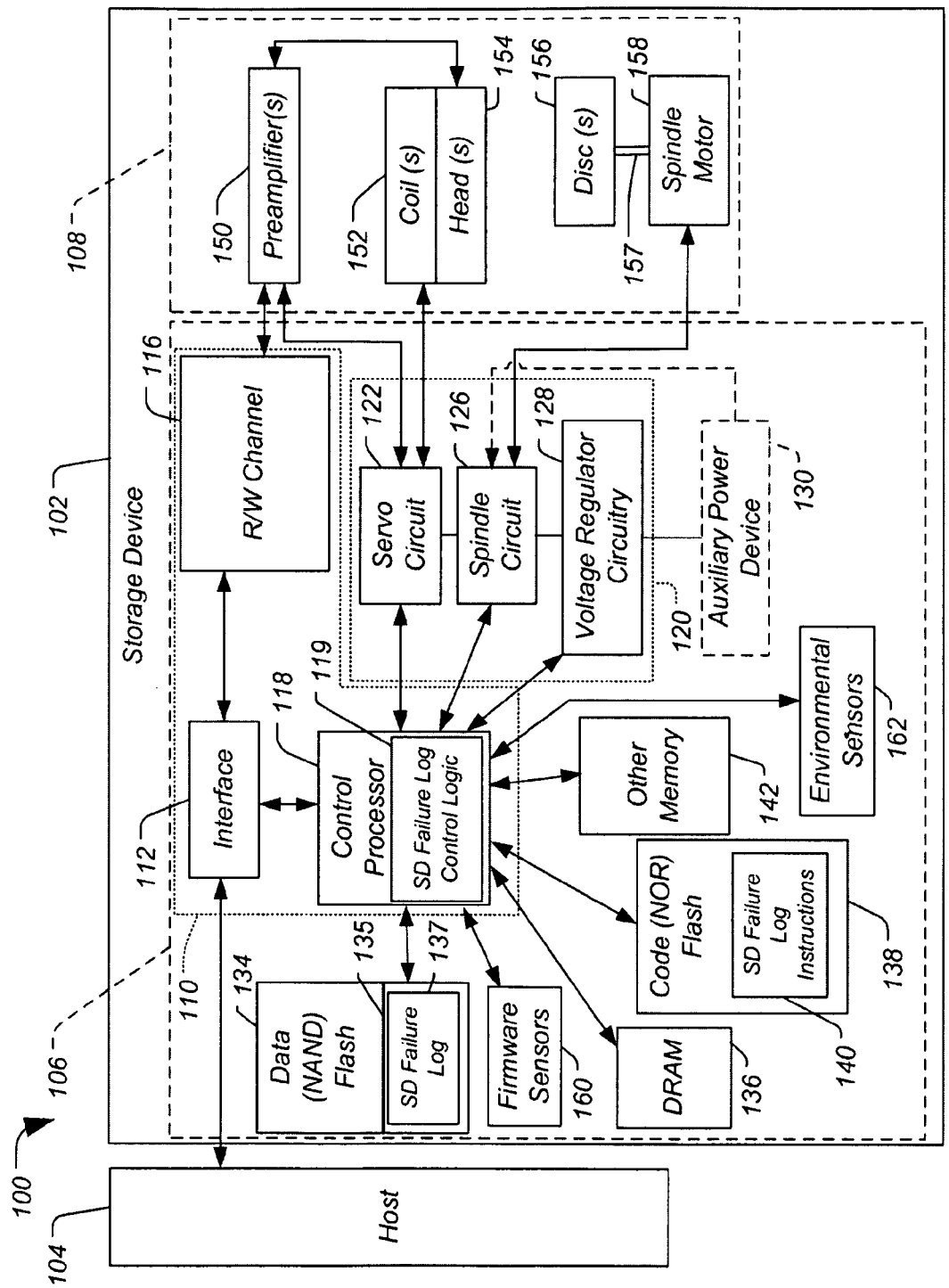
FIG. 1 is a block diagram of a particular illustrative embodiment of a system including a data storage device having a failure diagnostic log.

FIG. 1 is a block diagram of a particular illustrative embodiment of a system 100 including a data storage device 102 having a failure diagnostic log 137. In a particular embodiment, the data storage device 102 can be a hybrid data storage device that can include at least two different types of non-volatile data storage media. In a particular example, the hybrid data storage device 102 can include both rotating disc data storage media and solid-state data storage media. As used herein, the term "solid-state data storage media" refers to a device adapted to store and retrieve data without moving parts. The hybrid data storage device 102 may be adapted to communicate with a host system 104. In a particular embodiment, the host system 104 can be a computer (portable computer, desktop computer, server, or other computer), a processor, a music player, a personal digital assistant (PDA), another electronic device, or any combination thereof.

The hybrid data storage device 102 can include recording subsystem circuitry 106 and a head-disc assembly 108. The recording subsystem circuitry 106 may include storage device read/write control circuitry 110 and disc-head assembly control circuitry 120. The recording subsystem circuitry 106 can include an interface circuit 112, which can include a data buffer for temporarily buffering the data and a sequencer for directing the operation of a read/write channel 116. The recording subsystem circuitry 106 may further include a preamplifier 150 on the disc-head assembly 108. The interface circuit 112 may be coupled to the host system 104 and to a control processor 118, which may be adapted to control operation of the hybrid storage device 102.

In a particular embodiment, the control processor 118 can include storage device (SD) failure log control logic 119 that may be adapted to selectively store data related to the storage device 102 to the SD failure log 137 within a partition 135 of a solid-state data storage medium 134, such as a flash memory. The partition 135 may comprise a reserved and addressable portion of the solid-state data storage medium 134. In a particular embodiment, the partition 135 may be a hidden partition that may not be accessible to an operating system of the host system 104. In this instance, the partition is "hidden" in the sense that the operating system running on the host system 104 may not actually "see" that the partition 135 exists. Instead, available memory capacity and total memory capacity communicated by the storage device 102 may indicate the total memory size minus the size of the partition 135.

In a particular example, the SD failure log control logic 119 may be adapted to store environmental data from one or more environmental sensors 162, storage device state information from one or more firmware sensors 160, commands and data received from the host system 104 via the interface 112, and/or other information related to a state of the data storage device 102. In a particular embodiment, the state information can include a power mode of the data storage device 102, interface drive circuits state information, spindle motor 158 state information, actuator position state information, head selection state information, read/write channel settings state information, pre-amplifier 150 state information, environmental conditions (including temperature, vibration, shock detection, altitude, and other environmental parameters), other information, or any combination thereof.

The control processor 118 may be coupled to a servo circuit 122 that may be adapted to control the position of one or more read/write heads 154 relative to the one or more discs 156 as part of a servo loop established by the one or more read/write heads 154. The one or more read/write heads 154 can be mounted to a rotary actuator assembly to which a coil 152 of a voice coil motor (VCM) may be attached. The VCM can include a pair of magnetic flux paths between which the coil 152 may be disposed so that the passage of current through the coil 152 causes magnetic interaction between the coil 152 and the magnetic flux paths, resulting in the controlled rotation of the actuator assembly and the movement of the one or more heads 154 relative to the surfaces of the one or more discs 156. The servo circuit 122 may be used to control the application of current to the coil 152, and hence the position of the heads 154 with respect to the tracks of the one or more discs 156.

In a particular embodiment, the disc-head assembly control circuitry 120 can include the servo circuit 122 and can include a spindle circuit 126 that may be coupled to a spindle motor 158 to control the rotation of the one or more discs 156 via a spindle 157. The data storage device 102 also can include a voltage regulator circuit 128 that may be adapted to control power to the various components of the data storage device 102 and can include an auxiliary power device 130 that may be coupled to the disc-head assembly control circuitry 120 and that may be adapted to operate as a power source when power to the hybrid storage device 102 is lost. In a particular embodiment, the auxiliary power device 130 can be a capacitor or a battery that may be adapted to supply power to the hybrid storage device 102 under certain operating conditions. In a particular example, the auxiliary power device 130 can provide a power supply to the recording subsystem assembly 106 and to the disc-head assembly 108 to record data to the one or more discs 156 when power is turned off. Further, the auxiliary power device 130 may supply power to the recording subsystem assembly 106 to record data to a flash memory 134, such as a NAND or NOR flash data storage medium, or to another non-volatile memory, such as a code (NOR) flash 138, when power is turned off.

Additionally, the hybrid storage device 102 can include the flash memory 134, a dynamic random access memory (DRAM) 136, the code flash 138, other memory 142, or any combination thereof. In a particular embodiment, the code flash 138 can store storage device failure log instructions 140, which can be loaded and executed by the control processor 118 to provide the SD failure log control logic 119.

In a particular embodiment, the SD failure log control logic 119 may be adapted to monitor operational state information of the data storage device 102, including environmental data (such as temperature data, vibration data, shock data, other environmental data, or any combination thereof) from the one or more environmental sensors 162, state data (such as read/write head 154 selection and position information, preamplifier 150 state information, spindle 157 speed, bit error rate information, other information, or any combination thereof) from the one or more firmware sensors 160, commands and data received via the interface 112, other parameters, or any combination thereof.

The SD failure log control logic 119 may be adapted to store the operational state information to the SD failure log 137 within the failure partition 135. The SD failure log control logic 119 may periodically store the operational state information within the SD failure log 137. The operational state information can be stored at regular time intervals or a certain amount of time after a particular event. In another example, the operational state information can be stored each time a new command is received at the interface 112 from the host system 104, each time the control processor 118 completes execution of a host-initiated command, each time the data storage device 102 changes from a first state to a second state, at an interval when storage device activity falls below a pre-determined threshold activity level, or any combination thereof.

In a particular example, the SD failure log control logic 119 may be adapted to utilize the SD failure log 137 within the partition 135 of the data flash 134 as a non-volatile first in first out (FIFO) storage for the operational state data. The number of recorded states may be determined by a size of the partition 135 within the data flash 134. In another particular embodiment, the data flash 134 can be dedicated for the SD failure log 137. In this instance, the limit of the size of the SD failure log 137 may be determined by the size of the data flash 134.

In a particular example, the operational state data represents a historical window of commands, data, environmental and state parameters, and other information within a period of time immediately preceding (leading up to) a failure event. The recorded operational state data can also include recovery steps taken to mitigate or recover from a storage device failure. Such information may be used to diagnose the source of the storage device failure.

Figure 2:
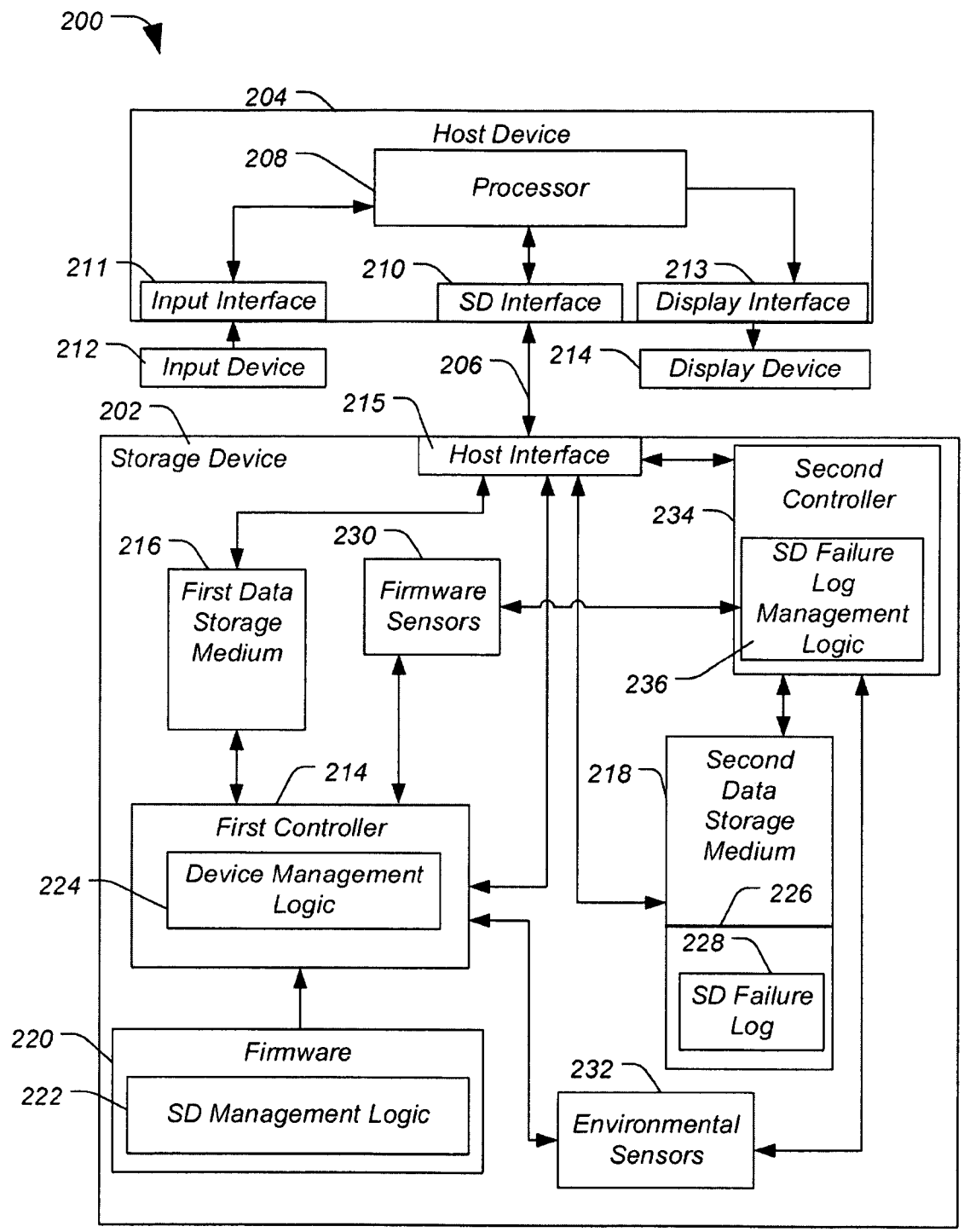
FIG. 2 is a block diagram of a second particular illustrative embodiment of a system including a data storage device having a failure diagnostic log.

FIG. 2 is a block diagram of a second particular illustrative embodiment of a system 200 including a data storage device 202 having a failure diagnostic log 228. The data storage device 202 may be adapted to communicate with a host device 204 via an interface bus 206. The host device 204 can be a computer, a mobile telephone, a music player, a personal digital assistant (PDA), another electronic device, or any combination thereof. The host device 204 can include a processor 208 that may be coupled to a storage device interface 210, which may be coupled to the interface bus 206. The host device 204 further can include an input interface 211 that may be coupled to the processor 208 and that may be responsive to an input device 212, such as a keyboard, a mouse, a pointer device, another input device, or any combination thereof. The host device 204 further can include a display interface 213, which may be coupled to the processor 208 and which may be coupled to a display device 214, such as a television, a computer display, a liquid crystal display (LCD), another display device, or any combination thereof. In some instances, the display device 214 may be integrated within the host device 204. For example, a personal digital assistant (PDA), a mobile telephone, a portable music player, a portable computer, or other portable devices may include an integrated display. In a particular embodiment, the data storage device 202 may also be integrated within the host device 204.

The data storage device 202 can include a host interface 215 that may be coupled to the interface bus 206, a first controller 214, and a first data storage medium 216. The first controller 214 may be adapted to control read/write access to the first data storage medium 216 via device management logic 224. The data storage device 202 further can include a second data storage medium 218 including a partition 226 to store a storage device (SD) failure log 228. The partition 226 may comprise a reserved and addressable portion of the second data storage medium 218 to store the SD failure log 228. As a reserved portion, neither the host device 204 nor the data storage device 226 may use the reserved portion other than for the storage of the SD failure log 228. The data storage device 202 can include firmware 220 including storage device management logic instructions 222, which can be loaded by the first controller 214 to manage read/write access to the first data storage medium 216. The data storage device 202 further can include a second controller 234 coupled to the host interface 215 that has storage device failure log management logic 236. The data storage device 202 further can include firmware sensors 230 and environmental sensors 232, which are coupled to the first controller 214 and to the second controller 234. In a particular embodiment, the firmware sensors 230 are adapted to monitor device parameters, including data error rates, storage parameters, and other state information of the data storage device 202. The environmental sensors 232 can be configured to measure temperature, vibrations, shock events, humidity, direction, acceleration, altitude, other physical data, or any combination thereof.

In a particular embodiment, the second controller 234 can include the SD failure log management logic 236 to monitor operational state information associated with the data storage device 202, including commands received from the host via the host interface 215, firmware data from the firmware sensors 230, environmental data from the environmental sensors 232, or any combination thereof. The SD failure log management logic 236 may be adapted to selectively store the operational state information in the SD failure log 228. In a particular embodiment, the SD failure log management logic 232 may be adapted to store the operational state information in the SD failure log 228 in a first in first out (FIFO) order. In another particular embodiment, the SD failure log management logic 232 can be adapted to monitor the first controller 214 and to store data related to a state of the first controller 214 into the SD failure log 228. For example, the SD failure log management logic 232 can update the SD failure log 228 each time a command is received from the host device 204 via the host interface 215, each time the first controller 214 finishes execution of a command, periodically, whenever a state of the data storage device 202 changes, or any combination thereof. In this instance, in the event of a storage device failure, data related to the state of the data storage device 202 immediately preceding the failure can be retrieved from the SD failure log 228 to diagnose a source of the failure.

In a particular example, the first data storage medium 216 and the second data storage medium 218 are both solid-state data storage media. In another particular embodiment, the first data storage medium 216 may be a disc data storage medium, and the second data storage medium 218 may be a solid-state data storage medium. The solid-state data storage medium can be a flash memory device, another type of non-volatile solid-state data storage media, or any combination thereof.

Figure 3:
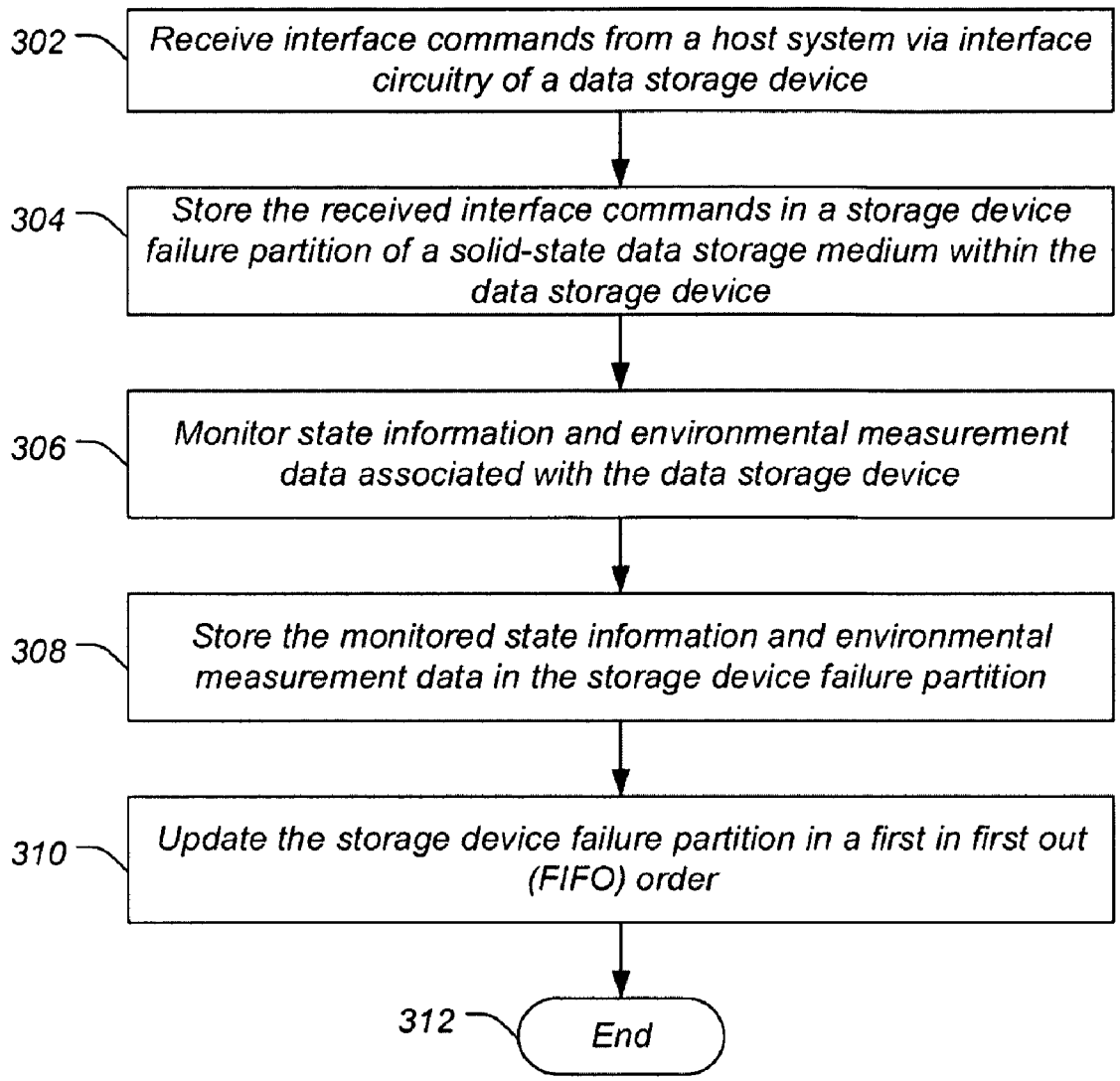
FIG. 3 is a flow diagram of a particular illustrative embodiment of a method of storing operational state information to a failure diagnostic log.

FIG. 3 is a flow diagram of a particular illustrative embodiment of a method of storing operational state information to a failure diagnostic log. At 302, interface commands are received from a host system via interface circuitry of a data storage device. Interface commands can include read commands, write commands, and other commands sent from the host system to the data storage device. Advancing to 304, the received interface commands are stored in a storage device failure partition of a solid-state data storage medium within the data storage device. The received interface commands also can be stored in a command queue, media cache, a buffer memory, another memory, or any combination thereof, pending execution of the received interface commands by the controller. Continuing to 306, state information and/or environmental measurement data associated with the data storage device can be monitored. In a particular embodiment, the data storage device can include firmware sensors, environmental sensors, other sensors, or any combination thereof. Proceeding to 308, the monitored state information and environmental measurement data are stored in the storage device failure partition. Moving to 310, the storage device failure partition may be updated in a first in first out (FIFO) order. The method terminates at 312.

In an example, as the storage device failure partition becomes full, the oldest data can be discarded to make room for new data. In a particular embodiment, the stored data represents a state of the storage device within a given time window. In the event of a storage device failure, the time window immediately preceding the storage device failure may be stored within the storage device failure log. Such data can provide data relevant to detecting a source of the device failure. For example, the storage device can be shipped to the manufacturer to recover the data, and the manufacturer can access the stored information within the storage device failure partition to potentially diagnose a source of the failure event. In a particular embodiment, the information within the storage device failure partition represents actual state measurements, including raw data, as opposed to error codes, though error code information can also be included.

Figure 4:
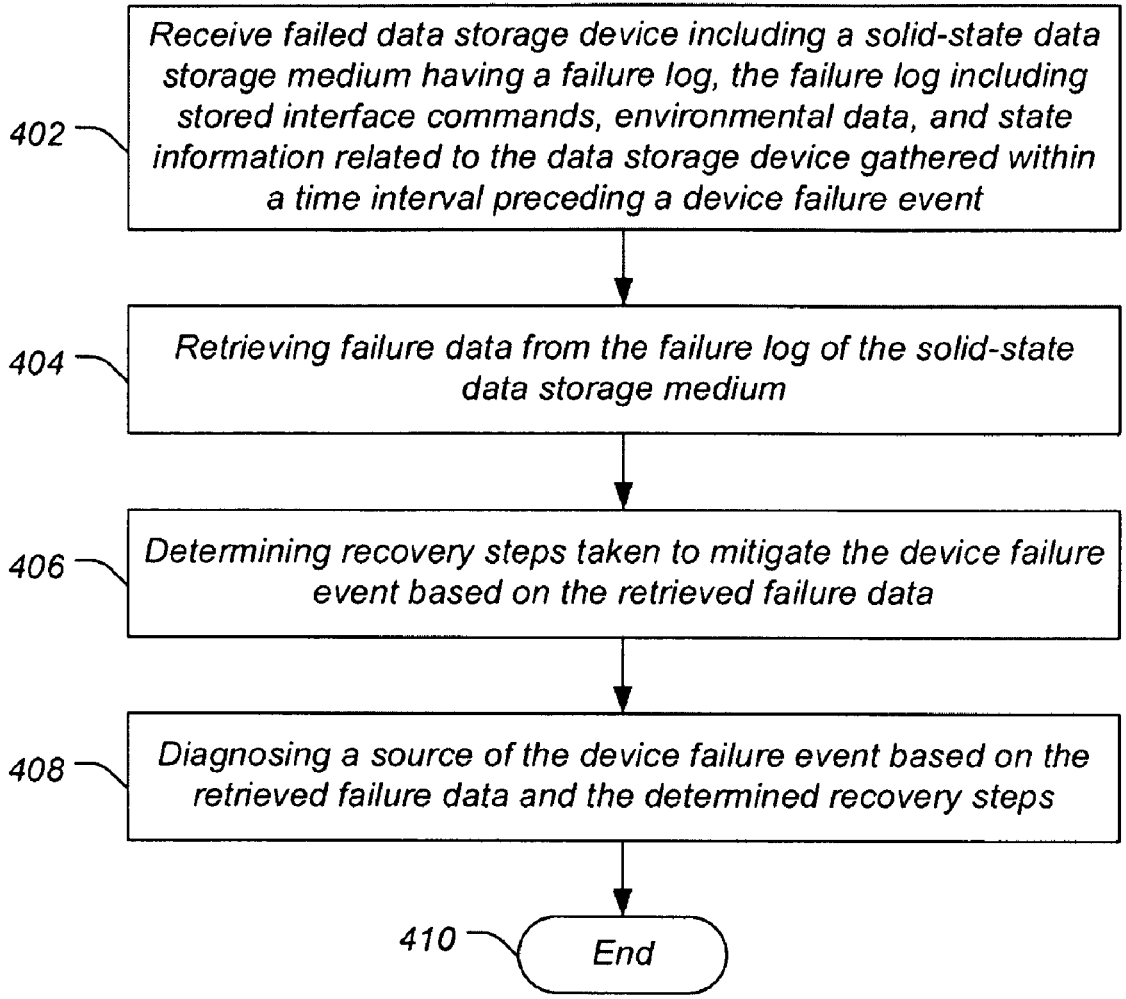
FIG. 4 is a flow diagram of a second particular illustrative embodiment of a method of diagnosing a cause of a data storage device failure based on a failure diagnostic log.

FIG. 4 is a flow diagram of a second particular illustrative embodiment of a method of diagnosing a cause of a data storage device failure based on a failure diagnostic log. At 402, a failed data storage device may be received that can include a solid-state data storage medium having a failure log, which can include operational state information, such as stored interface commands, environmental data, and state information related to the data storage device that was gathered within a time interval preceding a device failure event. In a particular embodiment, after a storage device failure, a system or the storage device itself may be shipped to a manufacturer to diagnose the defect and/or to recover data from the failed data storage device. Continuing to 404, failure data may be retrieved from the failure log of the solid-state data storage medium. In a particular example, the storage device may include an interface to allow direct connection between a manufacturer's diagnosis system and the solid-state data storage medium. In another particular embodiment, a system may be coupled to the data storage device via the host interface to retrieve the operational state information stored in the solid-state data storage device.

Advancing to 406, recovery steps taken to mitigate the device failure event are determined based on the retrieved failure data. In a particular example, recovery steps may have been performed on the data storage device by the owner or by an administrator. Such recovery steps may have been recorded in the failure log. Continuing to 408, a source of the device failure event may be diagnosed based on the retrieved failure data and the determined recovery steps. The method terminates at 410.

In conjunction with the systems and methods described above with respect to FIGS. 1-4, a data storage device may be disclosed that can include a controller with storage device failure log control logic to selectively store operational state information to a storage device failure log within a failure partition of a solid-state data storage medium. In a particular embodiment, the controller may be adapted to store the operational state information periodically, when commands are received via an interface, when the controller finishes execution of a command, at predetermined intervals when host activity falls below a threshold activity level, when the data storage device transitions from a first state to a second state (such as from a first power level to a second power level), or any combination thereof. In a particular example, the operational state information can include commands received over an interface, data associated with the commands, performance data associated with the data storage device, and environmental data associated with the data storage device (such as temperature, vibration data, shock event information, and other environmental data), firmware data, power levels of the data storage device, power levels of components of the data storage device, usage levels of data storage medium(s), a command execution state of the controller, other information, or any combination thereof. The firmware data can include bit error rate data, bad sector data, read/write circuitry state information, actuator position information, read/write head selection information, seek/settle criteria, other disc drive parameters, or any combination thereof.

Further, the controller can be adapted to selectively store the operational information when a trigger event occurs. The trigger event may be receiving a command or data from the data bus, executing a command, detecting a read or write error, detecting a data error, completion of an executed command, inactivity for a certain time, transition of the data storage device from a first state to a second state, or expiration of a timer.

Further, the operational state information can include recovery steps attempted to correct or recover data from a data storage medium in the failed data storage device and can include associated responses. In the event of a storage device failure, the operational state information can be accessed via an interface to allow a determination of a source of the storage device failure and to review steps taken by the data storage device or a host system to recover from the failure. In a particular embodiment, the operational state information can be used as "bread crumbs" for failure analysis.

It is to be understood that even though numerous characteristics and advantages of various embodiments have been set forth in the foregoing description, together with details of the structure and function of various embodiments, this disclosure is illustrative only, and changes may be made in detail, especially in matters of structure and arrangement of parts within the principles of the present disclosure to the full extent indicated by the broad general meaning of the terms in which the appended claims are expressed. For example, the particular elements may vary depending on the particular application for the data storage system including the storage device failure log and associated logic while maintaining substantially the same functionality without departing from the scope and spirit of the present disclosure. In addition, although an embodiment described herein is directed to a hybrid data storage system including storage device failure log control logic and an associated storage device failure log, it will be appreciated by those skilled in the art that the teachings of the present disclosure can be applied to solid-state data storage devices, disc drives, and other data storage systems, without departing from the scope and spirit of the present disclosure.

What is claimed is:

1. A device comprising:
    a data storage device including:
        a first data storage medium including a partition dedicated to store a log indicating operational state information representing states of the data storage device, the operational state information including data indicating recovery actions taken by the data storage device to recover from a failure event;
        a control circuit configured to monitor the operational state information of the data storage device; and
        a controller configured to selectively store the operational state information to the partition in a first-in first-out (FIFO) order;
        wherein the partition comprises a hidden partition that is not accessible to an operating system of a host computer connectable to the data storage device.

2. The device of claim 1, wherein the data storage device further comprises:
    an interface connectable to a data bus; and
    a second data storage medium adapted to store data received from the data bus;
    wherein the first data storage medium comprises a non-volatile solid state data storage medium and the partition comprises a reserved and addressable portion of the non-volatile solid state data storage medium.

3. The device of claim 2 wherein the operational state information comprises commands received over the interface, data associated with the commands, performance data associated with the data storage device, and environmental data associated with the data storage device.

4. The device of claim 3 wherein the performance data associated with the data storage device comprises power mode state data, interface drive circuit data, spindle motor data, actuator position data, read/write head selection data, read/write channel settings data, and preamplifier settings data.

5. The device of claim 3 further comprising at least one environmental sensor to monitor environmental data associated with the data storage device.

6. The device of claim 5 wherein the environmental data associated with the data storage device comprises temperature data, vibration data, and shock detection data.

7. The device of claim 2 further comprising the operational state information indicates commands received by the data storage device and a particular order of the commands.

8. The device of claim 1 wherein the controller is adapted to selectively store the operational information when a trigger event occurs.

9. The device of claim 8 wherein the trigger event is receiving a command or data from the data bus, executing a command, detecting a read or write error, detecting a data error, completion of an executed command, inactivity for a certain time, transition of the data storage device from a first state to a second state, or expiration of a timer.

10. The device of claim 1 wherein the operational state information comprises actual state measurements including raw data.

11. A data storage device comprising:
    an interface to receive data and commands from a host computer;
    a first data storage medium to store the data received at the interface;
    a second data storage medium including a failure partition having a hidden partition that is not accessible to the host computer, the hidden partition storing a storage device failure log;
    a control circuit configured to monitor the data storage device for state information including data indicating recovery actions taken by the data storage device to recover from a failure event; and
    a controller adapted to store the state information in the storage device failure log.

12. The data storage device of claim 11 wherein the failure partition comprises a reserved portion of the second data storage medium, the reserved portion not usable by the data storage device or a host system other than for storage of the storage device failure log, and the controller is configured to selectively store the state information to the storage device failure log in a first-in first-out (FIFO) order.

13. The data storage device of claim 12 wherein the first data storage medium comprises a disc data storage medium and wherein the second data storage medium comprises a non-volatile solid-state data storage medium.

14. The data storage device of claim 11 further comprising a second interface to allow a direct connection to the second data storage medium to allow access to the storage device failure log from external to the data storage device.

* * * * *